(12) United States Patent
Asao et al.

(10) Patent No.: US 9,985,486 B2
(45) Date of Patent: May 29, 2018

(54) ROTOR FOR MAGNETIC ROTATING ELECTRICAL MACHINE, PRODUCTION METHOD FOR SAME, AND DEVICE

(71) Applicants: Yoshihito Asao, Tokyo (JP); Masayuki Miyaoka, Tokyo (JP); Ryusuke Katayama, Tokyo (JP); Akihiko Mori, Tokyo (JP)

(72) Inventors: Yoshihito Asao, Tokyo (JP); Masayuki Miyaoka, Tokyo (JP); Ryusuke Katayama, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 597 days.

(21) Appl. No.: 14/395,669

(22) PCT Filed: Oct. 22, 2012

(86) PCT No.: PCT/JP2012/077254
§ 371 (c)(1),
(2) Date: Oct. 20, 2014

(87) PCT Pub. No.: WO2013/179510
PCT Pub. Date: Dec. 5, 2013

(65) Prior Publication Data
US 2015/0076950 A1    Mar. 19, 2015

(30) Foreign Application Priority Data

May 31, 2012 (JP) ................................ 2012-124023

(51) Int. Cl.
*H02K 1/27* (2006.01)
*H02K 15/03* (2006.01)
(Continued)

(52) U.S. Cl.
CPC ......... *H02K 1/278* (2013.01); *B32B 37/1284* (2013.01); *B32B 37/18* (2013.01);
(Continued)

(58) Field of Classification Search
CPC .............................. H02K 1/278; H02K 15/03
See application file for complete search history.

(56) References Cited

U.S. PATENT DOCUMENTS

| | | |
|---|---|---|
| 5,397,951 A | 3/1995 | Uchida et al. |
| 2004/0189129 A1 | 9/2004 | Takahashi et al. |

(Continued)

FOREIGN PATENT DOCUMENTS

| | | | | |
|---|---|---|---|---|
| EP | 2211442 A1 | 7/2010 | | |
| EP | 2381563 A2 * | 10/2011 | ............. | H02K 15/03 |

(Continued)

OTHER PUBLICATIONS

Communication dated Apr. 12, 2016 from the European Patent Office issued in corresponding Application No. 12877744.8.
(Continued)

*Primary Examiner* — Livius R Cazan
(74) *Attorney, Agent, or Firm* — Sughrue Mion, PLLC; Richard C. Turner (57) ABSTRACT

A method of manufacturing a rotor for a magnet type rotating electrical machine includes the steps of: cutting and laminating pieces of the core of the rotor, to thereby form a core (3); mounting the core (3) on a rotating jig (10); forming a magnet piece (2p) into a predetermined shape by sintering; mounting a predetermined number of the magnet pieces (2p) on a regulating jig (20); pressing the magnet pieces (2p) by the regulating jig (20) while rotating the core (3) by the rotating jig (10), to thereby mount the magnet pieces (2p) on the core (3); and adjusting an axial position of the magnet piece (2p) so that an axial end surface of the core (3) and an axial end surface of the magnet piece (2p) are aligned with each other.

6 Claims, 5 Drawing Sheets

(51) Int. Cl.
 *B32B 37/12* (2006.01)
 *B32B 37/18* (2006.01)
 *B32B 38/00* (2006.01)

(52) U.S. Cl.
 CPC ...... *B32B 38/0004* (2013.01); *B32B 38/0008* (2013.01); *H02K 15/03* (2013.01); *B32B 2457/00* (2013.01); *Y10T 156/1077* (2015.01)

(56) References Cited

U.S. PATENT DOCUMENTS

| | | | | |
|---|---|---|---|---|
| 2010/0244605 A1* | 9/2010 | Nakano | ................ | B62D 5/0403 310/156.01 |
| 2010/0244607 A1* | 9/2010 | Fujimoto | ............... | H02K 1/278 310/156.21 |
| 2011/0127870 A1* | 6/2011 | Onda | ..................... | H02K 1/278 310/156.12 |

FOREIGN PATENT DOCUMENTS

| | | | |
|---|---|---|---|
| JP | 05-161287 | A | 6/1993 |
| JP | 07-312853 | A | 11/1995 |
| JP | 2004-289936 | A | 10/2004 |
| JP | 2006-081360 | A | 3/2006 |
| JP | 2006-254676 | A | 9/2006 |
| JP | 2007-006641 | A | 1/2007 |
| JP | 2007006641 | A * | 1/2007 |
| JP | 2010-239800 | A | 10/2010 |
| JP | 2011-120328 | A | 6/2011 |
| WO | 03/026105 | A1 | 3/2003 |
| WO | 2009/063696 | A1 | 5/2009 |

OTHER PUBLICATIONS

Preliminary Notice of Reasons for Rejection of JP 2012-124023 dated Sep. 10, 2013.
International Search Report of PCT/JP2012/077254 dated Jan. 8, 2013.

* cited by examiner

ROTOR FOR MAGNETIC ROTATING ELECTRICAL MACHINE, PRODUCTION METHOD FOR SAME, AND DEVICE

CROSS REFERENCE TO RELATED APPLICATIONS

This is a National Stage of International Application No. PCT/JP2012/077254 filed Oct. 22, 2012, claiming priority based on Japanese Patent Application No. 2012-124023 filed May 31, 2012, the contents of all of which are incorporated herein by reference in their entirety.

TECHNICAL FIELD

The present invention relates to a rotor for a permanent magnet type rotating electrical machine, and to a method and apparatus for manufacturing the rotor.

BACKGROUND ART

Hitherto, as a rotor for a rotating electrical machine, it has been widely known to use a permanent magnet (hereinafter simply referred to as "magnet"). In this type of rotor, in order to reduce cogging torque when applied to a motor, it has been proposed to divide a ring-shaped magnet into segmented magnets each having a semi-cylindrical sectional shape (see, for example, Patent Literature 1).

The magnet of the rotor disclosed in Patent Literature 1 has a semi-cylindrical sectional shape, and the thickness of the magnet in cross section is set to be smaller at both end sides than at a center portion thereof. A core of the rotor is formed into a substantially polygonal prism. At respective corner portions of the polygonal prism, radial projections are formed and located at upper and lower ends of the core.

Note that, in the core of the rotor having the above-mentioned shape, each magnet is bonded between the projections with use of an adhesive.

In this case, applicable methods for bonding the magnet include a method involving pressing each magnet from a radially outer side toward the center of the core while holding the magnet onto the core and a method involving dropping the magnet from an axially upper side of the core so as to be bonded at a predetermined position. Those methods, however, need a large-scale jig for magnet bonding.

In magnet bonding, the magnet is positioned in a state in which one side surface of the magnet abuts on one side of the projection of the core. In this case, the magnet is positioned appropriately in a circumferential direction of the core, but there is no positioning means for an axis direction. Because of the relationship that an axial length of the core is larger than an axial length of the magnet, arrangement work is performed so as to prevent the magnet from protruding from the core.

CITATION LIST

Patent Literature

[PTL 1] WO 2009/063696 A1

SUMMARY OF INVENTION

Technical Problems

The related-art rotor for a magnet type rotating electrical machine and the related-art method and apparatus for manufacturing the rotor have a problem in that a large-scale jig is necessary for bonding the segmented magnet between the projections of the core of the rotor with use of an adhesive.

In bonding the magnet on the core, the magnet is positioned in the state in which one side surface of the magnet abuts on one side of the projection of the core, but there is no positioning means for the axis direction. Thus, there is another problem in that workability is poor.

The present invention has been made in order to solve the problems described above, and it is an object thereof to provide a rotor for a magnet type rotating electrical machine and a method and apparatus for manufacturing the rotor, which are capable of reliably positioning a core of the rotor and each magnet and capable of facilitating the manufacture thereof with a simple apparatus and configuration.

Solution to Problems

A rotor for a magnet type rotating electrical machine according to one embodiment of the present invention includes: a core having a columnar shape or a polygonal prism shape; and a plurality of magnets held in close contact with an outer circumferential surface of the core. The core includes a plurality of projections protruding to a radially outer side of the core, which are arranged along the outer circumferential surface. The plurality of projections are arranged at least in a vicinity of an axial end portion of the core. Each of the plurality of magnets has a strip shape in which a circumferential width is set to be smaller than an interval between the plurality of projections and an axial length is set to be smaller than an axial length of the core. A radially inner surface of the each of the plurality of magnets is held in close contact with the outer circumferential surface of the core between the plurality of projections. The each of the plurality of magnets is arranged so as to be offset with respect to a center portion between two of the plurality of projections located on both sides of the each of the plurality of magnets toward one of the two of the plurality of projections. A position of one axial end surface of the each of the plurality of magnets is aligned with a position of one axial end surface of the core.

Advantageous Effects of Invention

According to one embodiment of the present invention, the positioning between the core of the rotor and the segmented magnet can be facilitated, thus simplifying the manufacturing process and the manufacturing apparatus.

DESCRIPTION OF EMBODIMENTS

Example 1

Referring to the drawings, a first embodiment of the present invention is described below.

Figure 1:
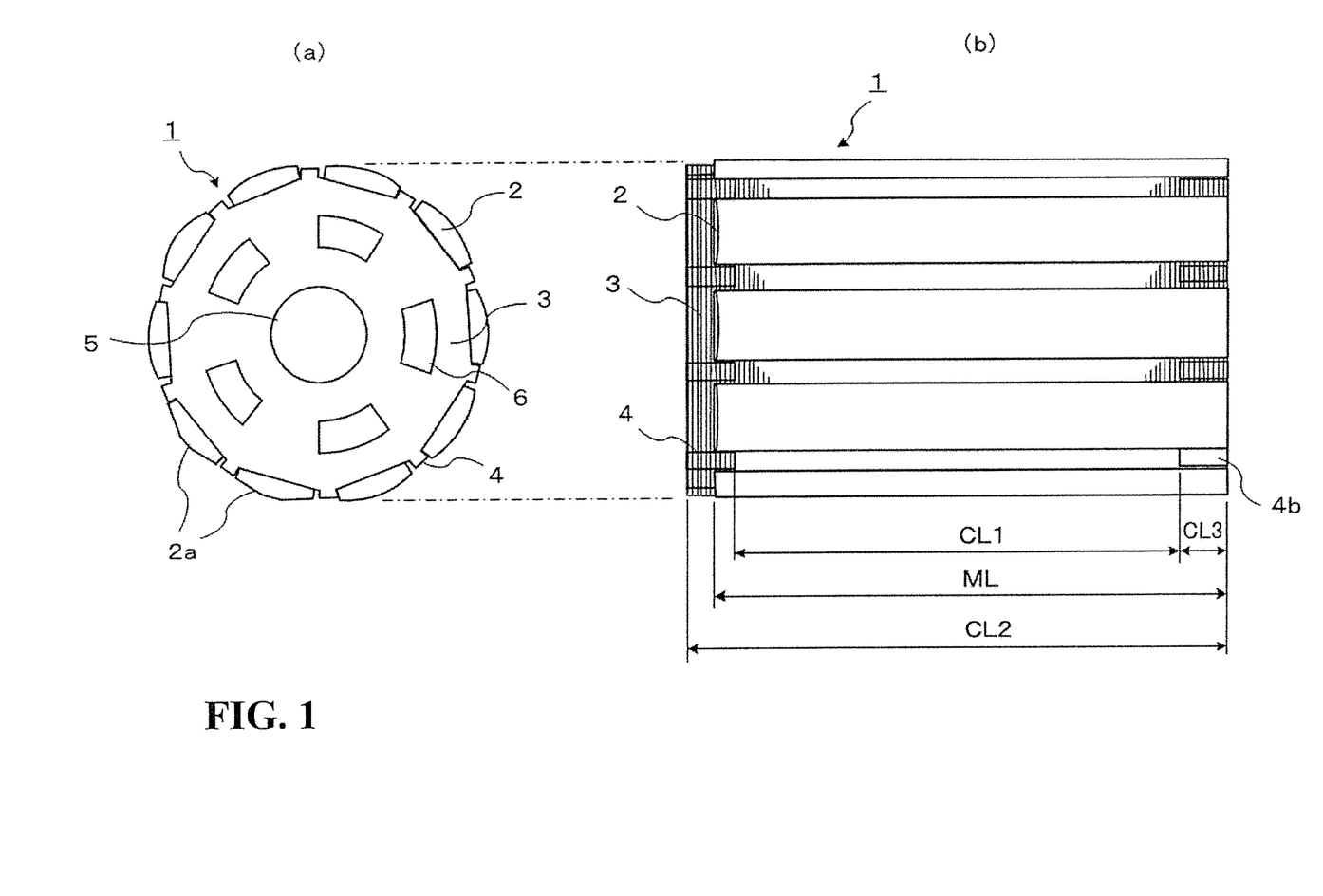
FIG. 1 are a top view and a side view illustrating a rotor for a magnet type rotating electrical machine according to a first embodiment of the present invention (Example 1).

FIGS. 1(a) and 1(b) are a top view and a side view illustrating a rotor 1 for a magnet type rotating electrical machine according to the first embodiment of the present invention.

In FIG. 1, the rotor 1 includes a core 3 made of a magnetic material on which a plurality of magnets 2 are positioned and arranged.

Projections 4 and 4b are arranged on both upper and lower end surfaces of the core 3 at equal intervals along an outer circumferential portion of the core 3. Both upper and lower end portions of each of the magnets 2 are positioned at respective side end surfaces of the projections 4 and 4b and are arranged at equal intervals along an outer circumferential surface of the core 3.

In the core 3, a center hole 5 is formed to penetrate therethrough along its central axis, and a plurality of peripheral holes 6 are formed to penetrate therethrough at the periphery of the center hole 5 so as to be in parallel to the center hole 5.

The core 3 of the rotor 1 has a substantially polygonal prism shape (for example, as illustrated in FIG. 1(a), a decagonal prism). The projections 4 and 4b are formed at respective corner portions of the polygonal prism on a radially outer side of the core 3.

Note that, although not illustrated, a cylindrical stator including a plurality of windings opposed to each magnet 2 is arranged on an outer circumferential portion of the rotor 1 so as to be opposed to each magnet 2, and a magnet type rotating electrical machine is constructed by the rotor 1 and the stator. An output shaft (not shown) of the magnet type rotating electrical machine is inserted through the center hole 5 of the core 3.

As illustrated in FIG. 1(b), the core 3 is formed by laminating a large number of thin plates in an axis direction.

Note that, the plurality of peripheral holes 6 are formed for the purpose of reducing the weight of the core 3, but the presence/absence of the peripheral holes 6 has no effect particularly on magnetic characteristics.

The magnet 2 having a strip shape (segmented shape) is mounted between the projections 4 and between the projections 4b so as to be in parallel to the axis direction.

In this case, a bottom surface of the magnet 2 bonded on the core 3 is flat because the magnet 2 is arranged on a flat surface portion of the polygonal prism. On the other hand, a top surface of the magnet 2 located on the radially outer side has a semi-cylindrical sectional shape.

Note that, the magnet 2 may have any shape as long as the thickness at a center portion thereof is larger than the thickness at both right and left end portions thereof so that the thickness becomes gradually smaller from the center portion toward both end sides. Thus, the magnet 2 is not limited to the semi-cylindrical magnet 2 (see FIG. 1).

Instead of the semi-cylindrical magnet 2, for example, a magnet 2a whose sectional shape is substantially trapezoidal may be used, which is partially illustrated in FIG. 1(a) for the sake of convenience.

Each magnet 2 is arranged so that one of the side surfaces of the magnet 2 at both the upper and lower end portions may abut on one side surface of each of the projections 4 and 4b along the radial height direction.

An axial length ML of the magnet 2 is set to be smaller than an axial length CL2 of the core 3, and one axial end surface (lower end surface) of the magnet 2 is flush with one end surface (lower end surface) of the core 3 with substantially no step. On the other hand, the other end surface (upper end surface) of the magnet 2 has a step with the end surface of the core 3 because ML<CL2 is established.

Specifically, the axial lengths have the relationship of CL2>ML>CL1, where CL2 represents the axial length of the core 3, ML represents the axial length of the magnet 2, and CL1 represents an axial length of a non-projection portion of the core 3 (the length excluding the projections 4 and 4b).

More specifically, the axial lengths have the relationship of CL2>ML>CL1+CL3, where CL3 represents an axial length of the projection 4b on the lower end side.

Note that, it is desired that the axial length CL1 of the non-projection portion of the core 3 have a value as close as possible to the axial length ML of the magnet 2.

This is because magnetic flux leakage from the N pole to the S pole is small and strong magnetic force can be obtained as compared to the case where the magnet 2 is located over the entire length of the projections 4 and 4b (CL2=ML).

The magnet 2 and the core 3 are bonded to each other with an adhesive 7 as described later (see FIG. 3), but another component (such as a cylindrical case) may be mounted on the outer circumference of the magnet 2 so as to prevent detachment or damage of the magnet 2.

Alternatively, the magnet 2 and the core 3 may be fixed to each other through fitting such as uneven fitting without using the adhesive 7.

Next, a manufacturing process for the rotor 1 according to the first embodiment of the present invention illustrated in FIG. 1 is described with reference to FIG. 2.

Figure 2:
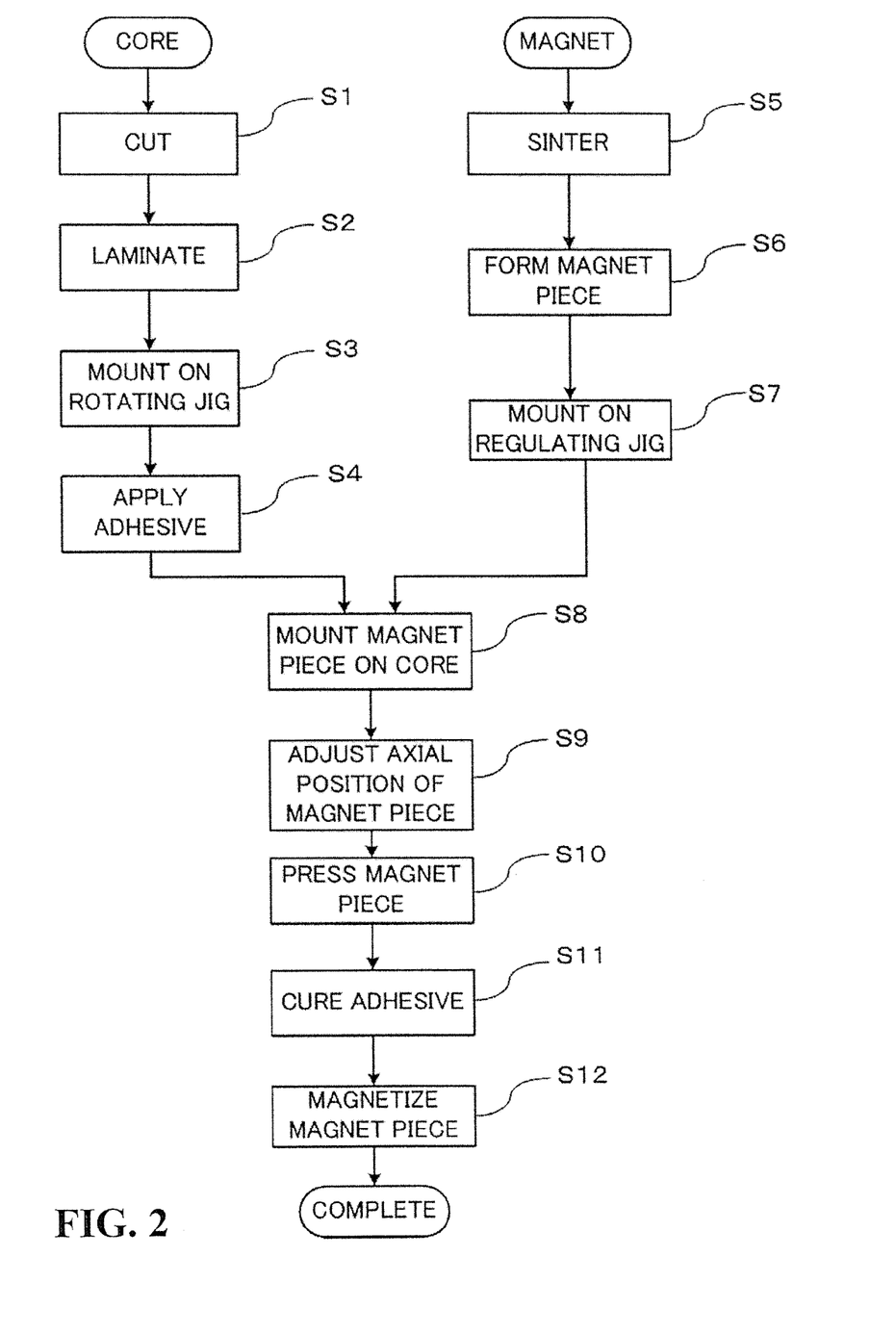
FIG. 2 is a flowchart schematically illustrating a manufacturing process for the rotor according to the first embodiment of the present invention (Example 1).

FIG. 2 is a flowchart schematically illustrating the manufacturing process for the rotor 1, and illustrates a process (Steps S1 to S4) relating to the core 3, a process (Steps S5 to S7) relating to the magnet 2, and a process (Steps S8 to S12) including the mounting of the magnet 2 on the core 3 and subsequent steps.

In FIG. 2, first, in order to manufacture the core 3, a thin steel plate is cut into a substantially polygonal shape to form a plurality of pieces of the core 3 (Step S1). In this case, the thin steel plate is out into a polygonal shape having the projections 4, the center hole 5, and the peripheral holes 6.

Subsequently, a predetermined number of the pieces of the core 3 are integrally laminated to one another with reference to the projections 4 or the center hole 5, to thereby form the core 3 having the length CL2 (Step S2).

Note that, various methods including welding and uneven fitting are applicable to the integral lamination of the pieces of the core 3.

Next, the core 3 completed in Step S2 is mounted on a jig (Step S3), and the adhesive 7 is applied on a mounting position of the magnet 2, that is, between the projections 4 on the outer circumferential portion of the core 3 (Step S4).

Note that, it is desired that the jig for mounting the core 3 thereon be capable of fixing the core 3 vertically in the axis direction and capable of rotating the core 3 in the circumferential direction of the core 3 as described later (see FIGS. 3 and 4).

In this case, in the adhesive application step (Step S4), the adhesive 7 can be applied in the state in which a rotating jig 10 is rotated.

On the other hand, in order to manufacture a piece of the magnet 2 to be bonded on the outer circumferential portion of the core 3, first, a material of the magnet 2 (powder) is put in a mold and sintered to manufacture a rough preform piece of the magnet 2 having a semi-cylindrical shape (Step S5).

Subsequently, the preform piece is subjected to cutting or the like so as to have a predetermined shape, to thereby form a magnet piece 2p having the final shape of the magnet 2 (see FIGS. 3 and 4) (Step S6).

Next, a predetermined number of magnet pieces 2p to be bonded on the core 3 are mounted on a magnet regulating jig in an aligned manner (Step S7).

Note that, as described later (see FIG. 3), the jig for magnet is a regulating jig 20 for regulating the orientation and movement of the magnet piece 2p.

Next, as described later (see FIG. 3), the magnet pieces 2p are mounted on the outer circumferential surface of the core 3 one by one in the state in which the core 3 is rotated (Step S8).

Subsequently, as described later (see FIG. 4), shift adjustment is performed so that an axial position of the magnet piece 2p may be aligned with an end surface position of the core 3 (Step S9).

Step S9 completes the shape of the rotor 1, but the magnet piece 2p is not magnetized yet. Further, if the adhesive 7 is not completely cured, the magnet piece 2p may fall off from the core 3.

As a countermeasure, next to Step S9, the magnet piece 2p is pressed toward the central axis of the core 3 (Step S10), and heating or the like is performed to cure the adhesive 7 so that all the magnet pieces 2p are fixed to the core 3 (Step S11).

Finally, each magnet piece 2p is magnetized to complete the rotor 1 as a final product (Step S12), thus finishing the manufacturing process of FIG. 2.

Note that, in FIG. 2, the step of pressing the magnet piece 2p (Step S10) is executed after the axial adjustment step (Step S9), but the execution order of Step S9 and Step S10 may be reversed.

In order to complete the rotor 1, the output shaft of the magnet type rotating electrical machine is finally inserted through the center hole 5 of the core 3. The step of inserting the output shaft through the center hole 5 may be executed after the final magnetization step (Step S12) or may be executed after the step of laminating the core 3 (Step S2).

Next, the step of bonding the magnet piece 2p on the core 3 is specifically described with reference to FIG. 3.

FIGS. 3(a) to 3(f) are explanatory top views illustrating the step of bonding the magnet piece 2p on the core 3 (Step S8). The axially lower end side of the core 3 is not illustrated.

Figure 3:
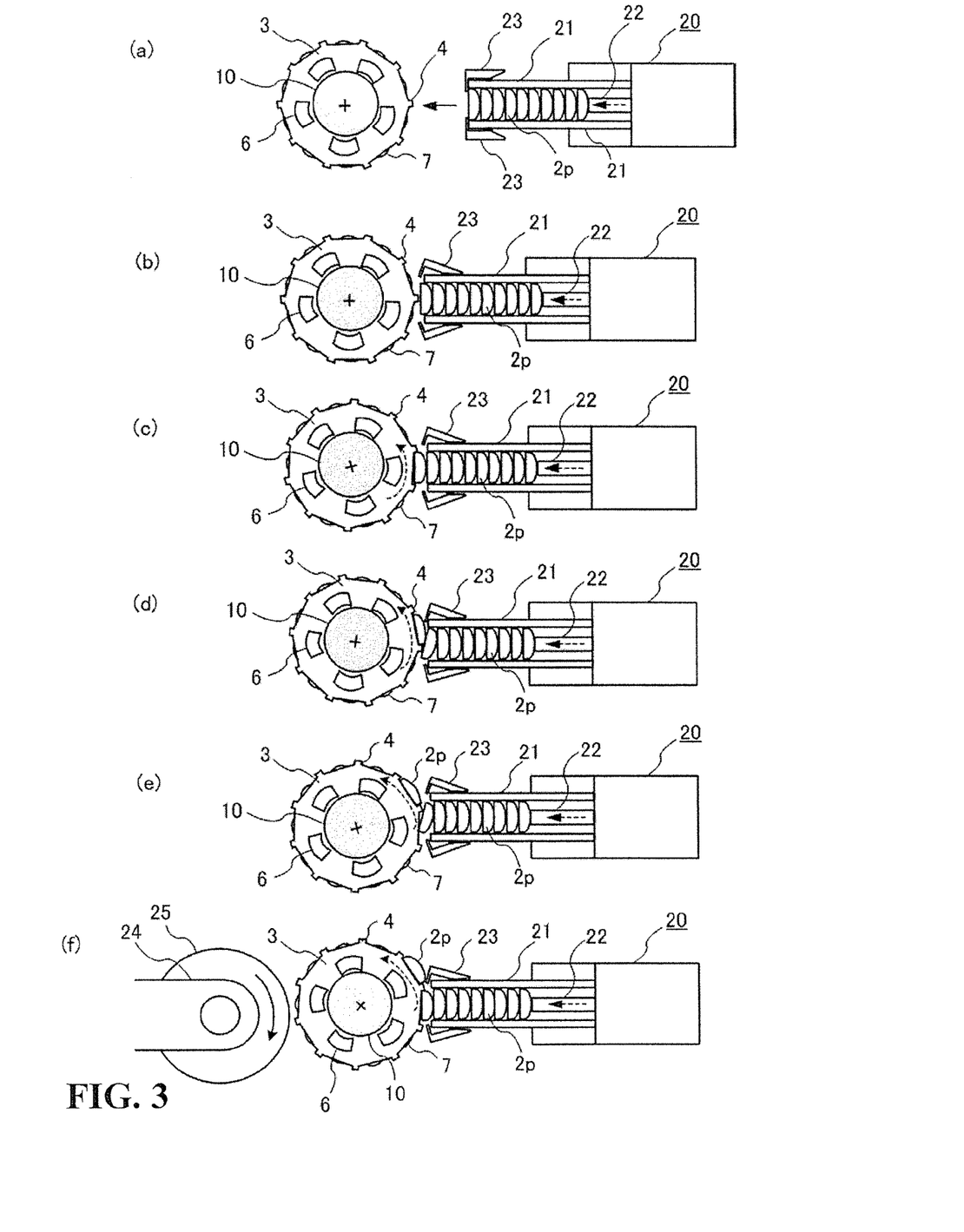
FIG. 3 are explanatory top views illustrating a step of bonding a magnet piece on a core according to the first embodiment of the present invention (Example 1).

FIG. 3 illustrate the mutual positional relationship among the core 3 mounted on the rotating jig 10, the magnet pieces 2p mounted on the regulating jig 20, and a pressing jig 24 for executing Step S10. Note that, the axial adjustment step (Step S9) to be executed on the lower end side of the core 3 is described later with reference to FIG. 4.

In FIG. 3, the regulating jig 20 for the magnet pieces 2p includes right and left regulating members 21 for housing the plurality of magnet pieces 2p with a fixed posture, a pressing rod 22 for biasing the magnet pieces 2p within the right and left regulating members 21 toward the side surface of the core 3, and gates 23 for opening distal end portions of the right and left regulating members 21 to discharge the magnet pieces 2p one by one when the magnet pieces 2p are to be mounted on the core 3.

First, as illustrated in FIG. 3(a), both axial ends of the core 3 (the lower end is not illustrated) are fixed by the rotating jig 10, and a set of (ten) magnet pieces 2p are mounted on the regulating jig 20 in the state in which the magnet pieces 2p are aligned by the right and left regulating members 21.

Note that, a magnet mounting surface of the core 3 has already been applied with the adhesive 7 in the adhesive application step (Step S4).

As illustrated in FIGS. 3(c) to 3(f), the rotating jig 10 rotates in the counterclockwise direction of the figures about a center portion (+) thereof each time the magnet piece 2p is mounted on the core 3.

The ten magnet pieces 2p are inserted between the right and left regulating members 21 of the regulating jig 20 in a state in which horizontal movement (vertical in the figures) is regulated and in a loosely fitted state.

In the right and left regulating members 21, the magnet piece 2p located on the rightmost side in the figures is pressed in the direction of the broken line arrow by the pressing rod 22, which is movable and has biasing force.

In the regulating jig 20, the gates 23 arranged on the right and left of the distal end portions of the right and left regulating members 21 (the leftmost side in the figures) are closed before the mounting step in order to prevent projection of the magnet piece 2p.

Note that, the adhesion of the magnet piece 2p with respect to the core 3 becomes larger as the biasing force of the pressing rod 22 becomes larger. It is, however, necessary to determine an appropriate value of the biasing force in consideration of damage avoidance of the magnet piece 2p itself, slidability of the magnet piece 2p during the rotation of the core 3, and the like.

The magnet pieces 2p mounted on the regulating jig 20 each move toward the core 3 together with the regulating jig 20 as indicated by the solid line arrow of FIG. 3(a) (left direction of FIG. 3(a)) and approach the outer circumferential portion of the core 3 as illustrated in FIG. 3(b).

In this case, the rotating jig 10 rotates in the counterclockwise direction, and as illustrated in FIG. 3(b), one projection 4 on the core 3 is positioned so as to face the center of the magnet pieces 2p aligned within the right and left regulating members 21.

Note that, the projection 4 may be positioned by the projection 4 itself or may be positioned with use of the peripheral holes 6.

In FIG. 3 (b), the magnet piece 2p approaches the core 3 along with the movement of the regulating jig 20, but there is a slight air gap between a distal end portion of the projection 4 of the core 3 and the end surface of the magnet piece 2p.

This position is amounting start position of the magnet piece 2p, and the right and left gates 23 are opened.

In this manner, the first leftmost magnet piece 2p aligned within the right and left regulating members 21 is pushed out by the pressing rod 22 to abut on the projection 4.

Subsequently, as illustrated in FIG. 3(c), when the rotating jig 10 starts to rotate in the counterclockwise direction (the direction of the broken line arrow), the first magnet piece 2p is pushed out between two adjacent projections 4 and is positioned and housed between the projections 4.

In this case, the first magnet piece 2p is not firmly fixed but temporarily fixed with the adhesive 7 to such an extent that the magnet piece 2p does not fall off from the outer circumferential side surface of the core 3.

The first magnet piece 2p is pressed by the biasing force of the pressing rod 22, and because the rotating jig 10 continues to rotate, the first magnet piece 2p moves in the temporarily fixed state to abut on a side wall of the projection 4 located on a backward side in the rotating direction instead of remaining at the center position between the two projections 4.

As a result, the magnet piece 2p finally abuts on only one of the two projections 4 located on the backward side, and is positioned.

Next, in FIG. 3(d), the rotating jig 10 continues to rotate, the gates 23 are opened, and the aligned magnet pieces 2p keep being biased. Thus, a top surface of the first magnet piece 2p and a bottom surface of the second magnet piece 2p are brought into contact with each other, and the second magnet piece 2p moves toward a predetermined position between the next projections 4 of the core 3 while sliding on the top surface of the first magnet piece 2p and on the projection 4.

Next, the rotating jig 10 further rotates, and in FIG. 3(e), the second magnet piece 2p is separated away from the first magnet piece 2p to be brought into contact with an application surface of the adhesive 7 between the next projections 4.

The rotating jig 10 further rotates, and in FIG. 3(f), the second magnet piece 2p is housed at the position between the projections 4 and temporarily fixed with the adhesive 7. After that, the above-mentioned sequence is repeated, and a set of (ten) magnet pieces 2p are temporarily fixed on the ten side surfaces of the core 3 having a decagonal prism shape.

In this manner, through the step of FIGS. 3(a) to 3(f), the magnet pieces 2p are sequentially mounted on predetermined positions one by one along with the rotation of the core.

One side surface of the magnet piece 2p abuts on the side surface of the projection 4 on the backward side in the rotating direction, and hence all the magnet pieces 2p are similarly housed at fixed positions.

In addition, in FIG. 3(f), the step of pressing the magnet piece 2p (Step S10) is executed by the pressing jig 24, which is arranged close to the core 3 and includes a roller 25.

In this pressing step, the roller 25 of the pressing jig 24 abuts on the magnet piece 2p while rotating in the direction of the solid line arrow in synchronization with the rotation of the core 3 to press the magnet piece 2p on the core 3, to thereby improve the adhesion with the core 3 and the conformability with the adhesive 7 and reliably prevent the fall-off of the magnet piece 2p.

Note that, in FIG. 3(f), the pressing jig 24 is arranged on the opposite side (corresponding to rotation of 180° of the core 3) of the mounting position of the magnet piece 2p (regulating jig 20), but the arrangement is not limited to that illustrated in FIG. 3(f). The pressing jig 24 may be arranged on the rotation side of the core 3 immediately next to the mounting position of the magnet piece 2p (for example, the rotation side of about 30° of the core 3).

As illustrated in FIGS. 3(b) to 3(f), by pressing and supplying the magnet pieces 2p while rotating the core 3, the second magnet piece 2p is moved so that the bottom surface thereof may slide on a back surface protruding portion (the curved surface of the semi-cylindrical shape) of the first magnet piece 2p and on the projection 4 of the core 3, and further the second magnet piece 2p abuts on one inner side of the projection 4 on the backward side in the rotating direction. Consequently, a set of magnet pieces 2p can be sequentially mounted on predetermined positions on the core 3.

In other words, the manufacturing apparatus according to the first embodiment of the present invention can be constructed merely by designing the configurations of the rotating jig 10 and the regulating jig 20, and hence the structure of the manufacturing apparatus is simple and small-scale.

However, the radial height of the projection 4 of the core 3 needs to be smaller than the maximum thickness of the magnet piece 2p (the position of the curved surface of the semi-cylindrical shape).

It is desired that the radial height of the projection 4 be equal to or smaller than the radial height of the side surface of the magnet piece 2p.

In FIGS. 1 to 3, the radially outer upper surface of the projection 4 (mounting surface for the magnet piece 2p) is a flat surface, but is not limited to a flat surface, and may be an arc shape, for example.

In addition, the sectional shape of the magnet piece 2p is semi-cylindrical, but is not limited to the semi-cylindrical shape. It should be understood that the same mounting method can be applied even when the sectional shape is rectangular parallelepiped, for example.

Next, the positioning of the magnet piece 2p in the axis direction is described with reference to FIG. 4.

Figure 4:
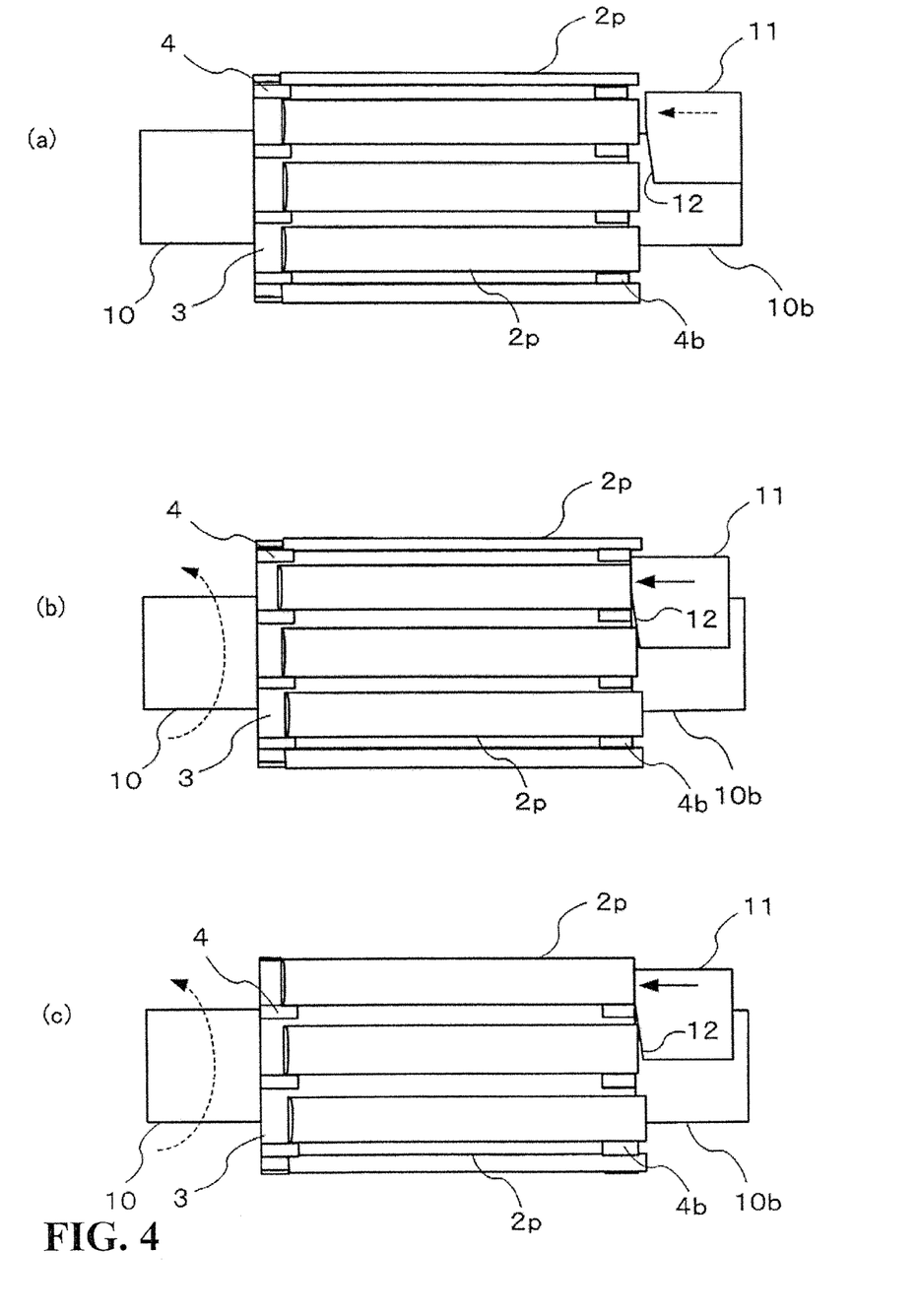
FIG. 4 are explanatory side views illustrating an axial adjustment step for the magnet piece according to the first embodiment of the present invention (Example 1).

FIGS. 4(a) to 4(c) are explanatory side views illustrating the axial adjustment step for the magnet piece 2p (Step S9).

In FIG. 4, an axial adjustment jig 11 for executing the axial adjustment step is arranged on the lower end side of the core 3.

The lower end side of the core 3 is positioned and fixed by a rotating jig 10b similar to the rotating jig 10 arranged on the upper end portion side of the core 3.

Note that, the axial adjustment jig 11 may be arranged at the rotation position of the core 3 (about 30°) immediately next to the regulating jig 20 in FIG. 3 with respect to the rotating direction of the core 3 indicated by the broken line arrow in FIGS. 4(b) and 4(c), or may be arranged at the position where the core 3 is rotated approximately by one turn (about 330°).

Through the mounting step of FIG. 3 alone, the circumferential position of the magnet piece 2p is determined, but the axial position thereof is not accurately determined.

In other words, as illustrated in FIG. 4(a), the mounting position of each magnet piece 2p in the axis direction (in the horizontal direction of FIG. 4(a)) is slightly shifted from the lower end surface of the core 3 due to fluctuations in pressing force of the magnet piece 2p, an amount and application position of the adhesive 7, and the like.

FIG. 4(a) illustrates the core 3 in the horizontal posture for the sake of convenience, but the core 3 is actually mounted in the vertical posture. In other words, the lower end portion of the magnet piece 2p protrudes downward slightly from the lower end portion of the core 3.

FIG. 4(a) illustrates the state immediately before the axial adjustment jig 11 moves in the direction of the broken line arrow to press the lower end portion of the magnet piece 2p. In this state, the core 3 is not rotated yet.

The axial adjustment jig 11 includes an inclined surface 12 that is cut obliquely in one side end surface (a surface to abut on the magnet piece 2p when the core 3 rotates).

With this, as illustrated in FIGS. 4(b) and 4(c), one end surface of the magnet piece 2p is pushed along the inclined surface 12 along with the rotation of the core 3 (broken line arrow), and hence, finally, the magnet piece 2p is moved until the one end surface of the magnet piece 2p is aligned with one end surface of the core 3.

FIG. 4(b) illustrates the state in which the magnet piece 2p on which the axial adjustment jig 11 first abuts is pressed by the axial adjustment jig 11 along with the movement thereof (solid line arrow). It is understood that when the core 3 rotates (broken line arrow), the magnet piece 2p is moved until the lower end surface (right end surface in FIG. 4(b)) of the magnet piece 2p becomes flush with the lower end surface (right end surface in FIG. 4(b)) of the core 3.

FIG. 4(c) illustrates the state in which, on the upstream side in the rotating direction (broken line arrow) of the core 3, the magnet piece 2p pressed by the axial adjustment jig 11 is moved to a predetermined axial position (flush with the lower end surface of the core 3), and, on the downstream side in the rotating direction (broken line arrow) of the core 3, the magnet piece 2p before pressed by the axial adjustment jig 11 protrudes from the lower end surface of the core 3 before movement.

If the magnet piece 2p may fall off from the core 3 in the position adjustment step, a partition (not shown) only needs to be mounted at a position on an outer circumferential portion of the axial adjustment jig 11 in a rotation region from a rotation position before the axial adjustment jig 11 abuts on the magnet piece 2p to a rotation position at which the axial adjustment jig 11 is separated away from the magnet piece 2p.

With this, the fall-off of the magnet piece 2p can be prevented in the position adjustment step.

As illustrated in FIGS. 4(b) and 4(c), the rotation of the core 3 is utilized to adjust the axial position of the magnet piece 2p, to thereby hold one end surface of the core 3 and one end surface of the magnet piece 2p at a predetermined position. Consequently, the axial positioning can be easily performed as well.

Thus, as illustrated in FIGS. 3 and 4, the magnet piece 2p can be positioned with respect to the core 3 both in the circumferential direction and in the axis direction through the rotation of the core 3, and further the process can be simplified. Consequently, the rotor 1 can be achieved by a small-scale manufacturing apparatus.

Note that, it is desired that the position adjustment step for the magnet piece 2p in the axis direction illustrated in FIG. 4 (Step S9) be performed so that the axial adjustment jig 11 is arranged at a rotation position between the regulating jig 20 and the pressing jig 24 illustrated in FIG. 3(f) (for example, a 90° position).

This is because the steps proceed in the order of the mounting step for the magnet piece 2p on the core 3 (Step S8), the axial position adjustment (Step S9), and the pressing step for the magnet piece 2p (Step S10) of FIG. 2.

Note that, the curing period of the adhesive 7 varies depending on the kind of the adhesive 7 to be used. In general, the curing period is longer than the mounting period of the magnet piece 2p in FIGS. 3 and 4, and hence the rotor 1 completed in FIGS. 3 and 4 is removed from the rotating jigs 10 and 10b, and the curing step (heating step or the like) for the adhesive 7 is executed as another different step.

The regulating jig 20 regulates the magnet piece 2p so as to prevent the tilt of the magnet piece 2p at least at two upper and lower locations in accordance with the axial length ML of the magnet piece 2p. However, the regulating jig 20 needs to allow the magnet piece 2p to easily move within the right and left regulating member 21 in a loosely fitted state, rather than pressing down the magnet piece 2p.

The pressing rod 22 of the regulating jig 20 does not push the entire magnet piece 2p in the width direction but presses only the vicinity of the center portion in the width direction.

The shape of a distal end portion of the pressing rod 22 may be changed depending on the mobility of the magnet piece 2p so as to push the vicinity of the center of the magnet piece 2p in the length direction, or the region from the center to the lower side, or alternatively two upper and lower portions in accordance with the axial length ML of the magnet piece 2p.

In addition, the rotating jigs 10 and 10b each hold the vicinity of the central axis of the core 3, and the regulating jig 20 also regulates apart of the magnet piece 2p in the axis direction. Thus, even when the diameter or axial length of the core 3 is different or when the number of magnet pieces 2p to be mounted is different, the same process and apparatus as in FIGS. 3 and 4 can be used to mount the magnet pieces 2p on the core 3.

Consequently, the present invention can support the rotors 1 having various sizes.

As described above, the rotor 1 for a magnet type rotating electrical machine according to the first embodiment (FIGS. 1 to 4) of the present invention includes: the core 3 having the polygonal prism shape; and the plurality of magnets 2 (2b) held in close contact with the outer circumferential surface of the core 3. The core 3 includes the plurality of projections 4 (4b) protruding to the radially outer side of the core, which are arranged along the outer circumferential surface. The plurality of projections 4 are arranged at least in the vicinity of the axial end portion of the core 3.

Each of the plurality of magnets 2 has a strip shape in which the circumferential width is set to be smaller than the interval between the projections 4 and the axial length ML is set to be smaller than the axial length CL2 of the core 3.

The radially inner surface of the each of the plurality of magnets 2 is held in close contact with the outer circumferential surface of the core 3 between the plurality of projections 4. The each of the plurality of magnets 2 is arranged so as to be offset with respect to the center portion between two projections 4 located on both sides of the each of the plurality of magnets 2 toward one of the two projections 4. The position of one axial end surface of the each of the plurality of magnets 2 is aligned with the position of one axial end surface of the core 3.

The thickness of the circumferential center portion of the each of the plurality of magnets 2 is set to a value larger than the radial height of each of the two projections 4 located on both the sides of the each of the plurality of magnets 2.

The magnet mounting surface between the plurality of projections 4 includes a flat surface, and the radially inner circumferential surface of the each of the plurality of magnets 2 includes a flat surface equivalent to the magnet mounting surface.

In addition, the each of the plurality of magnets 2 is formed so that, in the sectional shape, the thickness of the circumferential center portion thereof is larger than the thickness of both side surface portions thereof, and the thickness becomes smaller from the circumferential center portion toward both the side surface portions.

Further, the method of manufacturing the rotor 1 for a magnet type rotating electrical machine according to the first embodiment (FIG. 2) of the present invention, the rotor 1 including: the core 3 having a polygonal prism shape, in which a predetermined number of projections 4 (4b) protruding to the radially outer side of the core are arranged along the outer circumferential surface of the core 3; and a predetermined number of magnets 2 held in close contact with the outer circumferential surface of the core 3, includes: the cutting step (Step S1) of cutting a thin steel plate to form pieces of the core 3; the lamination step (Step S2) of laminating a predetermined number of the pieces of the core 3 corresponding to the axial length of the core 3, which are formed in the cutting step, to thereby form the core 3; the rotating jig mounting step (Step S3) of mounting the core 3 formed in the lamination step on the rotating jig 10; the application step (Step S4) of applying the adhesive 7 on the magnet mounting position of the outer circumferential surface of the core 3; the magnet piece formation step (Steps S5 and S6) of forming the magnet pieces 2p each having a strip shape and serving as a preform for the magnet 2 by sintering; the regulating jig mounting step (Step S7) of mounting, on the regulating jig 20 in an aligned manner, a predetermined number of the magnet pieces 2p to be mounted on the core 3, which are formed in the magnet piece formation step; the magnet mounting step (Step S8) of pressing each of the magnet pieces 2p onto the core 3 by the regulating jig 20 while rotating the core 3 by the rotating jig 10, to thereby sequentially mount the predetermined number of the magnet pieces 2p on the magnet mounting positions of the core 3 one by one; and the magnetization step (Step S12) of magnetizing the each of the predetermined number of the magnet pieces 2p mounted on the core 3 in a predetermined direction.

The magnet piece formation step includes forming the magnet pieces 2p so that, in cross section, the thickness of the center portion thereof is larger than the thickness of both side surfaces thereof and the thickness becomes smaller from the circumferential center portion toward both side surface portions, that the thickness of the center portion is larger than the radial height of each of the projections 4 of the core 3, and that the axial length ML of each of the magnet pieces 2p is smaller than the axial length CL2 of the core 3.

The magnet mounting step includes mounting the each of the magnet pieces 2p so that the radially inner circumferential surface thereof is mounted on the circumferential magnet mounting position between two projections 4 of the core 3 in the positional relationship in which, when the rotating jig 10 rotates, one side surface of the each of the magnet pieces 2p abuts on one circumferential inner side wall of the two projections 4, and an air gap is formed between another side surface of the each of the magnet pieces 2p and another side wall of the two projections 4.

The method of manufacturing the rotor 1 for a magnet type rotating electrical machine according to the first embodiment of the present invention further includes an axial adjustment step of moving, after the magnet pieces 2p are each mounted on the predetermined circumferential position within the magnet mounting position in the magnet mounting step, one axial end surface of each of the magnet pieces 2p to be aligned with one axial end surface of the core 3. The axial adjustment step includes moving the one axial end surface of the each of the magnet pieces 2p toward the one axial end surface of the core 3 through rotation of the rotating jig 10.

The magnet mounting step further includes the steps of: mounting the core 3 on the rotating jig 10 and rotating the core 3; and pressing the magnet piece 2p arranged at the distal end portion among the predetermined number of the magnet pieces mounted on the regulating jig 20 to the rotating core 3 in an opposed manner.

The method of manufacturing the rotor 1 for a magnet type rotating electrical machine according to the first embodiment of the present invention further includes the pressing step (Step S10) of pressing, after the magnet mounting step, each of the magnet pieces 2p toward the central axis of the core 3.

The method further includes the magnet fixing step (Step S11) of curing, after the pressing step, the adhesive 7 to fix the each of the magnet pieces 2p to the core 3.

In addition, the apparatus for manufacturing the rotor 1 for a magnet type rotating electrical machine according to the first embodiment of the present invention, the rotor 1 including: the core 3 having a columnar shape or a polygonal prism shape, the core including a predetermined number of projections 4 (4b) protruding to the radially outer side of the core, which are arranged along the outer circumferential surface of the core 3; and a predetermined number of magnets 2 each having a strip shape, each of which is held in close contact with the outer circumferential surface of the core 3 so as to abut on one side surface of corresponding one of the predetermined number of projections 4, includes: the cutting device for cutting a thin steel plate to form pieces of the core 3; the lamination device for laminating a predetermined number of the pieces of the core 3 corresponding to the axial length of the core 3, to thereby form the core 3; the rotating jig 10 for mounting the core 3 thereon in a rotatable manner; the application device for applying the adhesive 7 on the magnet mounting position of the outer circumferential surface of the core 3; the magnet piece formation device for forming the magnet pieces 2p each having a strip shape and serving as a preform for the magnet; the regulating jig 20 for mounting thereon in an aligned manner, a predetermined number of the magnet pieces 2p to be mounted on the core 3; the axial adjustment jig 11 for aligning the position of one axial end surface of each of the predetermined number of the magnet pieces 2p with the position of one axial end surface of the core 3; and the magnetization device for magnetizing the each of the predetermined number of the magnet pieces 2p mounted on the core 3 in a predetermined direction.

The above-mentioned manufacturing apparatus is configured to: sequentially mount the predetermined number of the magnet pieces 2p on the magnet mounting positions of the core 3 one by one by pressing the predetermined number of the magnet pieces 2p on the core 3 with the regulating jig 20 while rotating the core 3 with the rotating jig 10; and bring the radially inner surface of each of the predetermined number of the magnet pieces 2p into close contact with the outer circumferential surface of the core 3 between the predetermined number of projections 4, and arrange the each of the predetermined number of the magnet pieces 2p to be offset with respect to the center portion between two projections located on both sides of the each of the magnet pieces 2p toward one of the two projections.

The apparatus for manufacturing the rotor 1 for a magnet type rotating electrical machine according to the first embodiment of the present invention further includes the pressing jig 24 including the roller 25, for pressing each of the predetermined number of the magnet pieces 2p arranged on a predetermined position within the magnet mounting position of the core 3 toward the central axis of the core 3.

In this manner, after the magnet pieces 2p arrayed within the regulating jig 20 are sequentially mounted on the core 3 rotated by the rotating jig 10, the axial position of each of the magnet pieces 2p is adjusted through use of the rotation of the core 3 to easily align the axial end surface of the core 3 and the axial end surface of the magnet with each other. After that, the magnet piece 2p is magnetized to be the magnet 2, and the rotor 1 can be completed.

Consequently, the first embodiment of the present invention can facilitate the positioning between the core 3 of the rotor 1 and the strip-shaped (segmented) magnet 2, thereby being capable of providing the rotor 1 for a magnet type rotating electrical machine and the method and apparatus for manufacturing the rotor 1, which are capable of easily mounting the magnet 2 on a predetermined position of the core 3 of the rotor 1.

Example 2

Note that, in the above-mentioned first embodiment (FIGS. 1 to 4), the sectional shape of the core 3 is a polygonal prism, and the bonding surface for the magnet 2 (magnet piece 2p) between the projections 4 is a flat surface. Alternatively, however, as illustrated in FIG. 5(a), the sectional shape of a core 3A may be substantially circular, and a magnet piece 2b having an arc sectional shape may be mounted between projections 4c.

Figure 5:
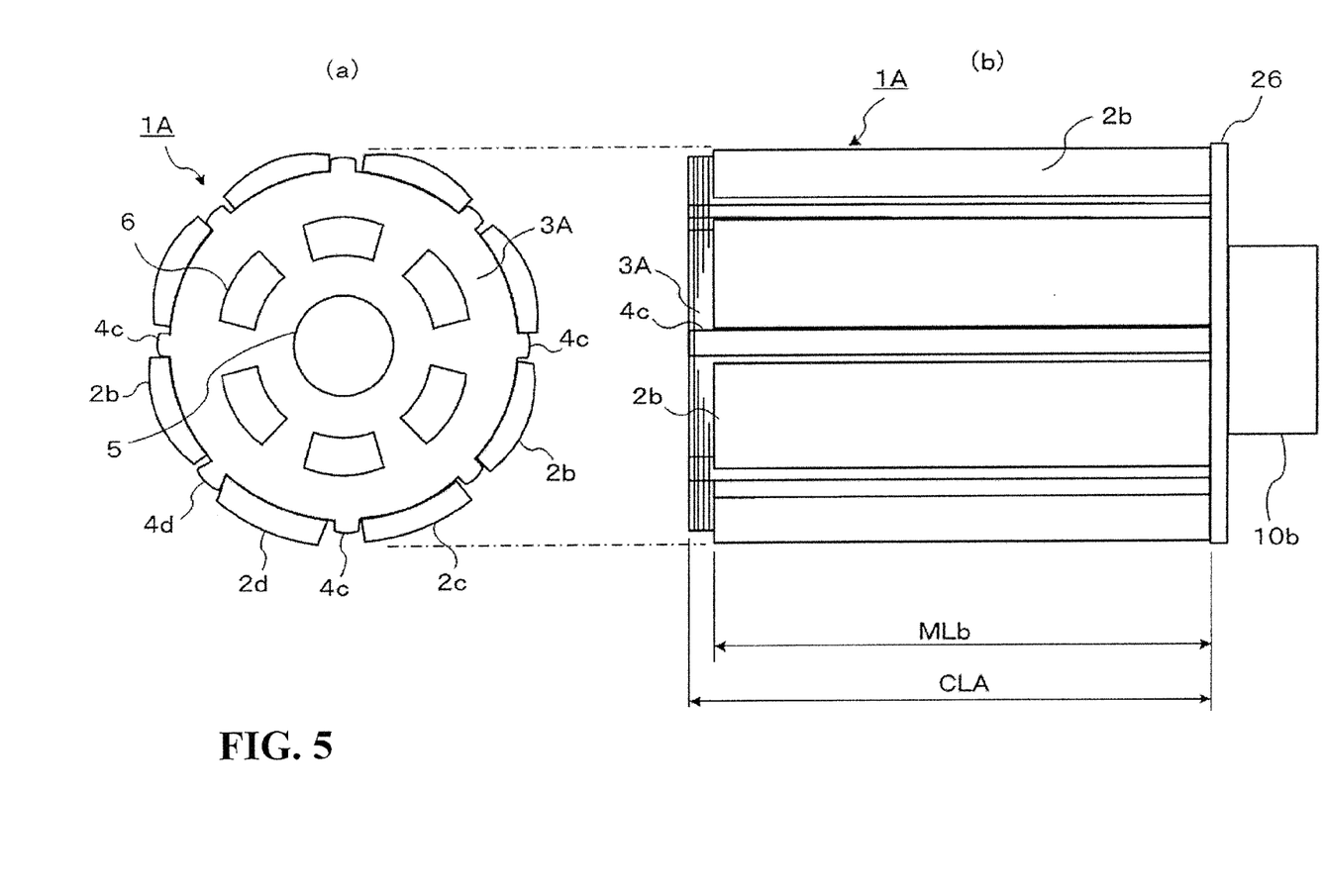
FIG. 5 are a top view and a side view illustrating an axial adjustment step for a rotor for a magnet type rotating electrical machine according to a second embodiment of the present invention (Example 2).

As illustrated in FIG. 5(b), a regulating plate 26 for collectively adjusting the axial positions of the magnet pieces 2p may be used.

FIGS. 5(a) and 5(b) are a top view and a side view illustrating an axial adjustment step for a rotor 1A for a magnet type rotating electrical machine according to a second embodiment of the present invention. Like parts as those described above (see FIGS. 1 and 4) are denoted by like reference symbols as described above or reference symbols are suffixed with "A", and detailed descriptions thereof are omitted.

Note that, in the manufacturing steps for the core 3A and the magnet piece 2b, the same processing steps and jigs as those described above (see FIGS. 2 and 3) can be applied.

Also in this case, similarly to the above, the magnet pieces 2b each have a strip shape, and the circumferential width of the strip shape is set to be smaller than the interval between the projections 4c. The basic shape of the magnet piece 2b and the positioned state of the magnet piece 2b with respect to the core 3A are the same as described above.

As illustrated in FIG. 5(b), an axial length MLb of the strip-shaped magnet piece 2b is set to be smaller than an axial length CLA of the core 3A.

In FIG. 5, the regulating plate 26 for collectively adjusting the axial positions of the plurality of magnet pieces 2b is arranged on a lower end portion of the rotor 1A.

The outer circumferential shape in cross section of the core 3A constructing the rotor 1A is substantially circular, and eight projections 4c are formed on an outer circumferential portion thereof. The lower end portion of the core 3A is held by the rotating jig 10b. Note that, in this case, the projection 4c is formed continuously from an upper end surface of the core 3A to a lower end surface thereof.

The magnet piece 2b has an arc shape conforming to the outer circumferential shape of the core 3A, and is mounted between the projections 4c in a temporarily fixed state.

One side surface of the magnet piece 2b is regulated by one inner surface of the projection 4c. The lower end surface of the magnet piece 2b is adjusted by the regulating plate 26 so as to be aligned with the end surface of the core 3A.

The arc-shaped magnet piece 2b has an eccentric shape approximated to the above-mentioned semi-cylindrical magnet 2 (FIG. 1), and is formed so that the thickness of a center portion thereof in the rotating direction is larger than that of both end portions. In other words, when each radius of curvature of the inner circumferential diameter and the outer circumferential diameter of the magnet piece 2b is considered, the magnet piece 2b has a convex lens shape in which the outer circumferential diameter is smaller than the inner circumferential diameter.

However, the shape of the magnet piece is not limited to the eccentrically-shaped magnet piece 2b as illustrated in FIG. 5.

For example, as partially illustrated in FIG. 5(a) for the sake of convenience, instead of the eccentrically-shaped magnet piece 2b, an arc-shaped magnet piece 2c in which an inner circumferential diameter and an outer circumferential diameter are substantially equal to each other (uniform thickness) may be used, and further, an arc-shaped magnet piece 2d (the side length is larger on the inner circumferential surface side than on the outer circumferential surface side) close to a trapezoid may be used.

Note that, in the case where the magnet piece 2d is used, instead of the projection 4c, as partially illustrated in FIG. 5(a) for the sake of convenience, a projection 4d in which an outer circumferential surface is larger than an inner circumferential surface is formed on the outer circumferential portion of the core 3A so that the projection 4d may be engaged with the side surface (inclined surface) of the magnet piece 2d.

In any of the cases where the above-mentioned magnet pieces 2b, 2c, and 2d are used, as compared to the above-mentioned first embodiment where the (semi-cylindrical) magnet 2 (magnet piece 2p) is used, the volume of the magnet is reduced by the inner arc portion. Consequently, the reduction in cost of the magnet itself can be achieved.

As the number of the magnets becomes smaller, there is an advantage in that the cost reduction effect becomes larger when the arc-shaped magnet pieces 2b are used.

Note that, for example, even if the thickness of the magnet piece 2b is reduced by 10%, the magnetic force of the completed magnet after magnetization is not reduced by 10%.

Although not described herein in detail, the same apparatus as that described above (FIG. 3) is applicable in the step of mounting the arc-shaped magnet piece 2b on the core 3A. By pressing the magnet piece 2b while rotating the core 3A, the magnet piece 2b can be bonded and mounted.

In FIG. 5, a radially outer upper surface of the projection 4c has an arc shape in which a center portion is convex, thereby facilitating the movement of the magnet piece 2b.

It is desired that the arc of the projection 4c be smaller than the arc of the inner circumferential surface of the magnet piece 2b.

In the above-mentioned position adjustment step (FIG. 4), the position adjustment can be performed by utilizing the pressing of the axial adjustment jig 11 and the rotation of the core 3. According to the second embodiment (FIG. 5) of the present invention, however, the positions can be collectively adjusted merely by arranging the regulating plate 26 on the rotating jig 10b in the vicinity of the lower end surface (right end surface in FIG. 5) of the core 3A.

Alternatively, however, similarly to the above (FIG. 4), the axis direction of the magnet piece 2b may be positioned by using the axial adjustment jig 11 having the inclined surface 12 to press up the magnet piece 2b while rotating the core 3A.

The magnet piece 2d, which is partially illustrated in FIG. 5(a), has an inclined side surface, and has such a shape that the inner circumferential surface to be held in close contact with the core 3A is longer than the outer circumferential surface.

In this case, the projection 4d to be engaged with the inclined side surface of the magnet piece 2d has such a shape opposite to the inclined side surface of the magnet piece 2d that the length of the outer circumferential surface is set to be larger than that of the inner circumferential surface closer to the core 3A. The projection 4d is engaged with one side surface of the magnet piece 2d, and hence there is an advantage in that the projection 4d can serve to prevent detachment of the magnet piece 2d.

As illustrated in FIG. 5(b), the axial length of the projection 4c (4d) is set to be equal to the axial length CLA of the core 3A, and hence, although this configuration is somewhat disadvantageous for leakage magnetic flux of the magnet, every thin steel plate for the core 3A can be stamped out into the same shape in the above-mentioned cutting step (Step S1) (FIG. 2). Consequently, the manufacturing process can be simplified.

By appropriately designing the manufacturing equipment such as the above-mentioned rotating jig 10 and regulating jig 20 (FIG. 3) and an adhesive application device (not shown), the axial position adjustment can be further simplified as well.

As described above, the rotor 1A for a magnet type rotating electrical machine according to the second embodiment (FIG. 5) of the present invention includes: the core 3A having a columnar shape; and the plurality of magnets (magnet pieces 2b) held in close contact with the outer circumferential surface of the core 3A. The core 3A includes the plurality of projections 4c (4d) protruding to the radially outer side, which are arranged along the outer circumferential surface. The plurality of projections 4c are arranged over the same length as the axial length CLA of the core 3A. Each of the plurality of magnets has a strip shape in which the circumferential width is set to be smaller than the interval between the projections 4c and the axial length MLb is set to be smaller than the axial length CLA of the core 3.

The radially inner surface of the each of the plurality of magnets (magnet pieces 2b) is held in close contact with the outer circumferential surface of the core 3A between the plurality of projections 4c. The each of the plurality of magnets is arranged so as to be offset with respect to the center portion between two projections 4c located on both sides of the each of the magnets toward one of the two projections. The position of one axial end surface of the each of the plurality of magnets is aligned with the position of one axial end surface of the core 3A.

In addition, the magnet mounting surface between the plurality of projections 4c includes an arc surface, and the radially inner circumferential surface of the each of the plurality of magnets includes an arc surface equivalent to the magnet mounting surface.

Further, the method of manufacturing the rotor 1A for a magnet type rotating electrical machine according to the second embodiment (FIG. 2) of the present invention, the rotor 1A including: the core 3A having a columnar shape, in which a predetermined number of projections 4c protruding to the radially outer side are arranged along the outer circumferential surface thereof; and a predetermined number of magnets (magnet pieces 2b) held in close contact with the outer circumferential surface of the core 3A, includes: the cutting step of cutting a thin steel plate to form pieces of the core 3A; the lamination step of laminating a predetermined number of the pieces of the core corresponding to the axial length of the core 3A, which are formed in the cutting step, to thereby form the core 3A; the rotating jig mounting step of mounting the core 3A formed in the lamination step on the rotating jig 10; the application step of applying the adhesive 7 on the magnet mounting position of the outer circumferential surface of the core 3A; the magnet piece formation step of forming the magnet pieces 2b each having a strip shape and serving as a preform for the magnet 2; the regulating jig mounting step of mounting, on the regulating jig 20 in an aligned manner, a predetermined number of the magnet pieces 2b to be mounted on the core 3A, which are formed in the magnet piece formation step; the magnet mounting step of pressing each of the magnet pieces 2b onto the core 3A by the regulating jig 20 while rotating the core 3A by the rotating jig 10, to thereby sequentially mount the predetermined number of the magnet pieces 2b on the magnet mounting positions of the core 3A one by one; and the magnetization step of magnetizing the each of the predetermined number of the magnet pieces 2b mounted on the core 3A in a predetermined direction.

The magnet mounting step includes: arranging the core 3A upright so that the axis direction thereof becomes the normal; and arranging, on the axial lower end portion of the core 3A, the regulating plate 26 having the outer diameter larger than the outer diameter of the core 3A.

When each of the magnet pieces 2b is mounted on a predetermined circumferential position within the magnet mounting position of the core 3A, the each of the magnet pieces 2b falls due to its own weight to be arranged so that the axial lower end surface thereof abuts on the regulating plate 26 and is aligned with the axial lower end surface of the core 3A.

In addition, the apparatus for manufacturing the rotor 1A for a magnet type rotating electrical machine according to the second embodiment of the present invention, the rotor 1A including: the core 3A having a columnar shape, the core including a plurality of projections 4c (4d) protruding to the radially outer side, which are arranged along the outer circumferential surface thereof; and a plurality of magnets (magnet pieces 2b) each having a strip shape, each of which is held in close contact with the outer circumferential surface of the core 3A so as to abut on one side surface of corresponding one of the plurality of projections 4c, includes: the cutting device for cutting a thin steel plate to form pieces of the core 3A; the lamination device for laminating a predetermined number of the pieces of the core 3A corresponding to the axial length of the core 3A, to thereby form the core 3A; the rotating jig 10 for mounting the core 3A thereon in a rotatable manner; the application device for applying the adhesive 7 on the magnet mounting position of the outer circumferential surface of the core 3A; the magnet piece formation device for forming the magnet pieces 2b each having a strip shape and serving as a preform for the magnet; the regulating jig 20 for mounting thereon in an aligned manner, a predetermined number of the magnet pieces 2b to be mounted on the core 3A; the regulating plate 26 (axial adjustment jig) for aligning the position of one axial end surface of each of the predetermined number of the magnet pieces 2b with the position of one axial end surface of the core 3A; and the magnetization device for magnetizing the each of the predetermined number of the magnet pieces 2b mounted on the core 3A in a predetermined direction.

The above-mentioned manufacturing apparatus is configured to: sequentially mount the predetermined number of the magnet pieces 2b on the magnet mounting positions of the core 3A one by one by pressing the predetermined number of the magnet pieces 2b on the core 3A with the regulating jig 20 while rotating the core 3A with the rotating jig 10; and bring the radially inner surface of each of the plurality of magnet pieces 2b into close contact with the outer circumferential surface of the core 3A between the plurality of projections 4c, and arrange the each of the plurality of magnet pieces 2b to be offset with respect to the center portion between two projections 4c located on both sides of the each of the magnet pieces 2b toward one of the two projections 4c.

The rotating jig 10b includes the regulating plate 26 that functions as the axial adjustment jig, and the regulating plate 26 has the outer diameter larger than the outer diameter of the core 3A, and is arranged on the axial lower end surface of the core 3A.

This configuration can provide, similarly to the above-mentioned first embodiment, the rotor 1A for a magnet type rotating electrical machine and the method and apparatus for manufacturing the rotor 1A, which are capable of easily mounting the magnet (magnet piece 2b) on a predetermined position of the core 3A of the rotor 1A.

In the above-mentioned first embodiment (FIG. 4), the axial position is adjusted by the pressing action of the axial adjustment jig 11 obtained along with the rotation of the core 3. According to the second embodiment of the present invention, however, the axial position can be adjusted merely by arranging the regulating plate 26 on the rotating jig 10b in the vicinity of the lower end surface (right side in FIG. 5) of the core 3A. Consequently, the adjustment work can be further simplified.

Specifically, for example, in the mounting step of FIG. 3, when the magnet piece 2b is separated away from the right and left regulating members 21 of the regulating jig 20 to move to the side surface of the core 3A, the magnet piece 2b slightly falls due to its own weight and stops in the state in which the lower end surface of the magnet piece 2b abuts on the regulating plate 26. Thus, the axial stop position of the magnet piece 2b is aligned with the lower end surface of the core 3A.

Consequently, the axial position of the magnet piece 2b is determined by the arrangement position of the regulating plate 26, and hence the fluctuations in axial position among the magnet pieces 2b can be easily prevented.

REFERENCE SIGNS LIST 1, 1A rotor, 2, 2a magnet, 2b, 2c, 2d, 2p magnet piece, 3, 3A core, 4, 4b, 4c, 4d projection, 5 center hole, 6 peripheral hole, 7 adhesive, 10, 10b rotating jig, 11 axial adjustment jig, 12 inclined surface, 20 regulating jig, 21 right and left regulating member, 22 pressing rod, 23 gate, 24 pressing jig, 25 roller, 26 regulating plate, S1 cutting step, S2 lamination step, S3 rotating jig mounting step, S4 application step, S5 sintering step, S6 magnet piece formation step, S7 regulating jig mounting step, S8 magnet mounting step, S9 axial adjustment step, S10 pressing step, S11 magnet fixing step, S12 magnetization step

The invention claimed is:

1. A method of manufacturing a rotor for a magnet type rotating electrical machine, the rotor comprising:
   a core having a columnar shape or a polygonal prism shape, in which a predetermined number of projections protruding to a radially outer side of the core are arranged along an outer circumferential surface of the core; and
   a predetermined number of magnets held in close contact with the outer circumferential surface of the core,
   the method comprising:
   a cutting step of cutting a thin steel plate to form pieces of the core;
   a lamination step of laminating a predetermined number of the pieces of the core corresponding to an axial length of the core, to thereby form the core;
   a rotating jig mounting step of mounting the core formed in the lamination step on a rotating jig;
   an application step of applying an adhesive on a magnet mounting position of the outer circumferential surface of the core;
   a magnet piece formation step of forming magnet pieces each having a strip shape and serving as a preform for a magnet;
   a regulating jig mounting step of mounting, on a regulating jig in an aligned order, a predetermined number of the magnet pieces to be mounted on the core;
   a magnet mounting step of sequentially mounting the predetermined number of the magnet pieces onto the magnet mounting positions of the core while rotating the core by the rotating jig, by pressing each of the predetermined number of the magnet pieces onto the core by the regulating jig while sequentially dispensing, from the regulating jig, the magnet pieces one by one in the aligned order; and
   a magnetization step of magnetizing each of the predetermined number of the magnet pieces mounted on the core in a predetermined direction,
   wherein method further comprises an axial adjustment step of moving, after the predetermined number of the magnet pieces are each mounted on a predetermined axial end surface of each of the predetermined number of the magnet pieces to be aligned with one axial end surface of the core, and
   wherein the axial adjustment step comprises moving the one axial end surface of the each of the predetermined number of the magnet pieces toward the one axial end surface of the core through rotation of the rotating jig.

2. A method of manufacturing a rotor for a magnet type rotating electrical machine according to claim 1,
   wherein the magnet piece formation step comprises forming the magnet pieces so that, in cross section, a thickness of a center portion thereof is larger than a thickness of both side surfaces thereof and the thickness becomes smaller from a circumferential center portion toward both side surface portions, that the thickness of the center portion is larger than a radial height of each of the predetermined number of projections of the core, and that an axial length of each of the magnet pieces is smaller than the axial length of the core, and
   wherein the magnet mounting step comprises mounting the each of the predetermined number of the magnet pieces so that a radially inner circumferential surface thereof is mounted on a circumferential magnet mounting position between two of the predetermined number of projections of the core in a positional relationship in which, when the rotating jig rotates, one side surface of the each of the predetermined number of the magnet pieces abuts on one circumferential inner side wall of the two of the predetermined number of projections, and an air gap is formed between another side surface of the each of the predetermined number of the magnet pieces and another side wall of the two of the predetermined number of projections.

3. A method of manufacturing a rotor for a magnet type rotating electrical machine according to claim 1, wherein the magnet mounting step further comprises the steps of:
   mounting the core on the rotating jig and rotating the core; and
   pressing a magnet piece arranged at a distal end portion among the predetermined number of the magnet pieces mounted on the regulating jig to the rotating core in an opposed manner.

4. A method of manufacturing a rotor for a magnet type rotating electrical machine according to claim 1, further comprising a pressing step of pressing, after the magnet mounting step, each of the predetermined number of the magnet pieces toward a central axis of the core.

5. A method of manufacturing a rotor for a magnet type rotating electrical machine according to claim 4, further comprising a magnet fixing step of curing, after the pressing step, the adhesive to fix the each of the predetermined number of the magnet pieces to the core.

6. A method of manufacturing a rotor for a magnet type rotating electrical machine, the rotor comprising:
- a core having a columnar shape or a polygonal prism shape, in which a predetermined number of protections protruding to a radially outer side of the core are arranged along an outer circumferential surface of the core; and
- a predetermined number of magnets held in close contact with the outer circumferential surface of the core, the method comprising:
- a cutting step of cutting a thin steel plate to form pieces of the core;
- a lamination step of laminating a predetermined number of the pieces of the core corresponding to an axial length of the core, to thereby form the core;
- a rotating jig mounting step of mounting the core formed in the lamination step on a rotating jig;
- an application step of applying the adhesive on a magnet mounting position of the outer circumferential surface of the core;
- a magnet piece formation step of forming magnet pieces each having a strip shape and serving as a preform for a magnet;
- a regulating jig mounting step of mounting, on a regulating jig in an aligned order, a predetermined number of the magnet pieces to be mounted on the core;
- a magnet mounting step of sequentially mounting the predetermined number of the magnet pieces onto the magnet mounting positions of the core while rotating the core by the rotating jig, by pressing each of the predetermined number of the magnet pieces onto the core by the regulating jig while sequentially dispensing, from the regulating jig, the magnet pieces one by one in the aligned order; and
- a magnetization step of magnetizing each of the predetermined number of the magnet pieces mounted on the core in a predetermined direction, wherein the magnet mounting step further comprises:
arranging the core upright so that an axis direction thereof becomes a normal;
arranging, on an axial lower end portion of the core, a regulating plate having an outer diameter larger than an outer diameter of the core; and
causing, when each of the predetermined number of the magnet pieces is mounted on a predetermined circumferential position within the magnet mounting position of the core, the each of the predetermined number of the magnet pieces to fall due to its own weight to be arranged so that an axial lower end surface thereof abuts on the regulating plate and is aligned with an axial lower end surface of the core.

* * * * *